Figure 1:
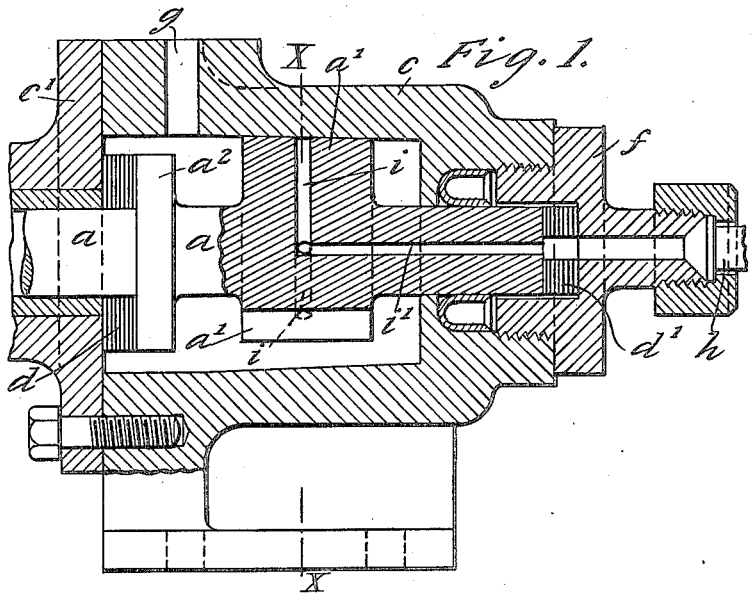

H. T. NEWBIGIN.
PUMPING OF VISCOUS SUBSTANCES.
APPLICATION FILED AUG. 11, 1919.

1,377,914.

Patented May 10, 1921.

Witnesses

Inventor
Henry T. Newbigin,
by
Attorney.

H. T. NEWBIGIN.
PUMPING OF VISCOUS SUBSTANCES.
APPLICATION FILED AUG. 11, 1919.
1,377,914.
Patented May 10, 1921.
2 SHEETS—SHEET 2.
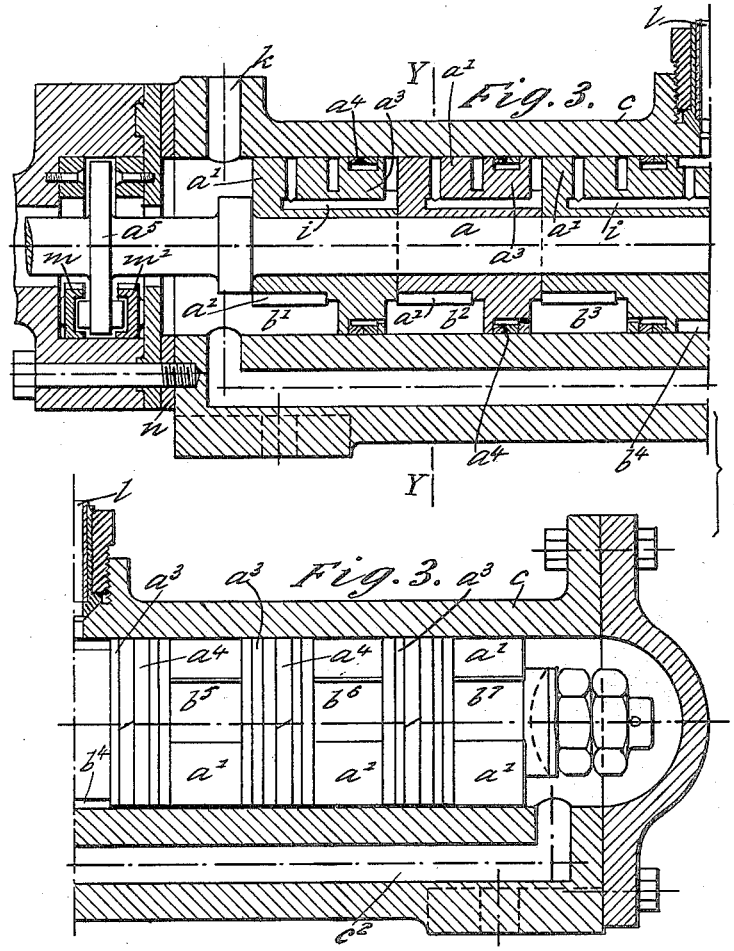
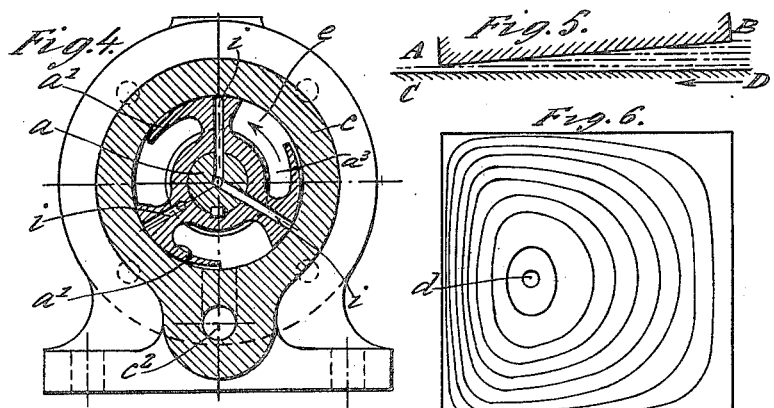
Inventor
Henry T. Newbigin,
by James L. Norris, Attorney.
Witnesses

UNITED STATES PATENT OFFICE.

HENRY THORNTON NEWBIGIN, OF NEWCASTLE-UPON-TYNE, ENGLAND.

PUMPING OF VISCOUS SUBSTANCES.

1,377,914.   Specification of Letters Patent.   Patented May 10, 1921.

Application filed August 11, 1919. Serial No. 316,849.

*To all whom it may concern:*

Be it known that I, HENRY THORNTON NEWBIGIN, a subject of the King of Great Britain, residing in Newcastle-upon-Tyne, England, have invented certain new and useful Improvements in or Relating to the Pumping of Viscous Substances, of which the following is a specification.

In the operation of certain classes of slow moving machinery, oil or similar viscous substances at high pressure are used, the pressure in the fluid being generated in pumps operated by a prime mover and moving at a relatively high speed. The arrangement is, in effect, a speed reduction gear, and as hitherto constructed the pressure has been generated in variable-capacity-chamber pumps.

A known alternative arrangement is to substitute for such pumps a shaft rotated by any convenient means and to press against the cylinder surface of the shaft and alternately on opposite sides of it semi-cylindrical bodies which form with the said surface channels which taper in the direction of rotation of the shaft, the bodies and shaft being immersed in lubricant which is conveyed through the channels by adhesion to the shaft surface and escapes under pressure by way of outlets at the narrower parts of the tapered channels.

It has long been known that an ordinary journal bearing will, under favorable conditions of lubrication, generate a comparatively high pressure in its oil film, due to the viscous flow of the oil and its adhesion to the relatively moving surfaces.

Journal bearings have recently been made in which, by subdividing the bearing surfaces into a number of pivoted blocks, this pressure-generating feature has been very much increased, and pressures of over 5000 lbs. per square inch have been generated by them, but the volume of oil that can be drawn off from such a bearing, when considered as a pump, is too small to make the arrangement a practical proposition as such.

In considering such a bearing as a pump, a pressure is generated in a thin wedge-shaped oil film between two relatively moving surfaces, and oil at zero pressure around the edges of one of the surfaces increases in pressure, due to its adhesion, viscosity and the relative motion of the surfaces, until it reaches a maximum at a point in the direction of motion behind the center of the area of the smaller surface. This maximum pressure is about twice the average pressure between the surfaces, and as the thickness of the film depends upon the average pressure, the volume of the oil that can be drawn off at the point of maximum pressure falls as the average pressure increases. It is, therefore, not possible to get, at the same time, a useful volume of fluid and a high pressure.

Furthermore, the pressure is generated by external loading on the bearing, and such an arrangement is not suitable where it is the pumping action only that is to be used.

My invention consists in making use of the viscous properties of an oil or like fluid as factors in an operation of pumping the fluid. To this end I propose to construct a pump in which I utilize the viscous action of the fluid to generate pressure, the movement of the fluid at a relatively high speed being obtained by a prime mover.

In order to do this I propose to employ the oil or like fluid in the form of a film and generate the pressure in the oil film by the mutual reaction of a plurality of surfaces, means being provided for regulating the thickness of the film formed.

I may, however, employ a plurality of such units coupled together in series so that the point of maximum pressure in one unit becomes the point of zero, or minimum pressure, in the next, and to provide means to prevent or restrict the flow back from a unit of higher to a unit of lower pressure.

I couple two such series of units together in opposition to one another, so that the pressure is built up toward a common outlet and end thrust is avoided.

Figure 2:
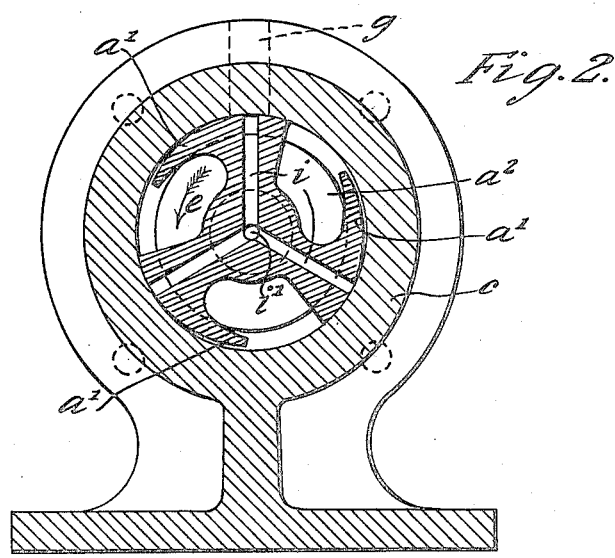

I will further describe my invention and how it can be carried into effect, by the help of the accompanying drawings, in which Figure 1 is an axial vertical section of an apparatus arranged for carrying out my improved method of pumping viscous fluids; Fig. 2 is a cross section on the line X—X of Fig. 1; Fig. 3 is a longitudinal vertical section of a modified form of the apparatus; Fig. 4 is a cross section on the line Y—Y in Fig. 3; Fig. 5 is a sectional diagram illustrating the relative positions of two opposing surfaces and an intervening wedge-shaped film of oil; and Fig. 6 is a plan view of one of the opposing surfaces in Fig. 5 with contours representing lines of equal pressure. Corresponding parts in the two forms of apparatus illustrated are denoted by the same letters in the drawings.

The apparatus shown in Figs. 1 and 2 comprises a cylinder $c$, slightly tapered from left to right, in which a rotor revolves. The rotor comprises a shaft $a$ on which is formed or attached an impeller which includes one or more operating parts or surfaces $a'$. In the apparatus illustrated in Figs. 3 and 4, there is mounted on the rotor shaft $a$ revolving in the cylinder $c$ a plurality of members, each of which consists of two portions, an impeller having one or more operating part or parts $a'$ and a diaphragm part or disk $a^3$ carrying suitable packing rings $a^4$. The diaphragms $a^3$ divide the bore of the cylinder $c$ into a plurality of chambers $b'$, $b^2$, $b^3$ ... $b^7$, in each of which an impeller works.

The action of the pump may be best described by reference to the diagrammatic Figs. 5 and 6. Let A—B represent a fixed block under which a very long plate (a portion of which is represented by C—D) slides from right to left. As shown, the two surfaces are inclined at a slight angle to one another and the distance between the two surfaces is assumed to be very small, say 1/1000". Conceive that a steady supply of oil is poured on to that portion of the surface C—D which lies to the right of the side B. This oil clings to the surface of C—D and is dragged with it under the block A—B. As the distance between the two surfaces diminishes from right to left, thus narrowing the channel way available, the surplus oil is squeezed out partly at the sides of the block and partly out near the edge B.

The term "squeeze" implies a pressure and in fact a pressure is established within the oil film which lies between the opposing surfaces A—B and C—D. The pressure will obviously be greater the greater the speed with which the oil is dragged in by the surface C—D and will also be greater the more viscous the oil, since it will obviously be more difficult to squeeze out the surplus fluid, when the oil has a treacly consistency, than when limpid like water.

It is a known fact that the pressure in the oil film under these conditions is not uniform, but that it increases from zero around the edges of the block A—B to a maximum at a point behind the center of the block in the direction of motion.

Fig. 6 shows a plan view of the block A—B with contour lines representing lines of equal pressure in the oil film from zero around the edges of the block to the maximum pressure at a point $d$. The pressure at this point is about twice the average pressure taken over the whole surface of the block.

The principle of my invention is to utilize this variation in the pressure of such films of oil or other viscous fluid so as to adopt them for pumping moderate quantities of viscous fluids at high pressures. To this end I employ a plurality of sets of such surfaces, and instead of all the sets starting at zero pressure I make pressure at the point of maximum pressure in one set of a series constitute the minimum pressure in the next set of the series and so build up a high pressure in a series of stages.

The action in such oil films is the same whether the surfaces are plane or curved; I prefer to use curved surfaces.

The impeller shown in Figs. 1 and 2 comprises three operating parts or surfaces $a'$ and rotates in the direction indicated by the arrow $e$. The surfaces $a'$ are arranged so that there is a slight angle between each of them and the inner surface of the cylinder $c$. This may be arranged for either by a permanent "backing off" of each surface $a'$, or by so forming the projecting portion of such surface as to cause it to deflect under the wedging action of the oil.

The object of tapering the cylinder is to regulate the thickness of the oil films. The position of the rotor in the cylinder may be regulated by means of loose washers $d$, interposed between the end cover $c'$ of the cylinder $c$ and a collar $a^2$ on the shaft $a$ and washers $d'$ between the end of the shaft and the outlet piece $f$. For stopping leakage cup leather or other packing may be employed between piece $f$ and the end of the cylinder $c$.

The action of the pump shown in Fig. 1 is as follows: Supposing the rotor be driven at a fairly high speed from some external source of power and the cylinder chamber filled with oil from the inlet $g$, then pressure oil films will be formed under the three parts or surfaces $a'$ of the impeller. Oil from the three points of maximum pressure on the impeller is drawn off through the radiating passages $i$ and the duct $i'$ and delivered through the channeled outlet pipe $f$ to the outlet tube $h$.

In a modified arrangement shown in Figs. 3 and 4 there are six impellers, each having three operating parts or surfaces $a'$ arranged at a slight angle to the inner surface of cylinder $c$. Although six impellers are here shown it will be understood that there may be any convenient number. They are arranged three at each end of the cylinder and act in opposition to one another so as to avoid end thrust in the shaft. The two ends of the cylinder are connected by a passage $c^2$ The position of the rotor in the cylinder is here regulated by the thrust collar $a^5$ and the bearings $m$, $m'$ and packing $n$.

If the rotor in the apparatus of Figs. 3 and 4 is driven at a fairly high speed, and the chambers $b'$, $b^2$ . . . $b^7$ be filled with oil from the inlet $k$, then pressure oil films will be formed under the three surfaces of the impellers forming two series, at the right and left hand ends of the cylinder respectively. Oil from the three points of maximum pressure on impellers $b'$ and $b^7$ is drawn off through the passages shown at $i$ and delivered to the chambers $b^2$ and $b^6$ and there becomes the initial pressure of the formation of oil films under the impellers in these chambers, and so on until the final pressure from both series of impellers is reached in the common chamber $b^4$ with which communicates the outlet tube 1.

Leakage from a chamber of higher pressure to one of lower pressure is restricted by means of the diaphragms or disks $a^3$ fitted with the packing rings $a^4$, or other suitable means for stopping leakage.

I claim—

1. A method of pumping viscous fluids which consists in employing the mutual reaction of parts of relatively moving, closely adjacent surfaces, slightly inclined to each other against the direction of motion, between which wedge-shaped pressure films are formed by the adhesion to and constriction of the fluid between these surfaces, thereby increasing the pressure in the fluid from a minimum around the edges of the moving surface to a maximum at a point in the direction of motion behind the center of the area of the said moving surface and drawing off the fluid from such point of maximum pressure, substantially as described.

2. A method of pumping viscous fluids which consists in employing the mutual reaction of pairs of relatively moving, closely adjacent surfaces, slightly inclined to each other against the direction of motion between which wedge-shaped pressure films are formed by the adhesion to and constriction of the fluid between the said pairs of surfaces, thereby increasing the pressure in the fluid from a minimum around the edges of the moving surfaces to a maximum at points in the direction of motion behind the center of the area of the said moving surfaces, drawing off the fluid from such points of maximum pressure, and making the pressure at the point of maximum pressure in one of said pairs of relatively moving surfaces constitute the minimum pressure in an adjacent pair of such surfaces, thereby building up a high pressure in stages in the unit.

3. In the method of pumping viscous fluids at high pressure stated in claim 2, arranging different units to work in opposition to one another, as and for the purpose described.

4. Apparatus for pumping viscous fluid consisting of a ported body member formed with an internal cylindrical chamber communicating through a port in the body member with a source of viscous fluid supply, a bored outlet piece attached to said member and a rotor revolubly mounted in the chamber, said rotor comprising a shaft and a fluid impelling member carried by the shaft, said impelling member having a peripherally disposed surface arranged closely adjacent to and at a slight angle to the inner surface of the cylindrical chamber against the direction of motion, and a delivery duct, extending from a point on the peripheral surface toward and communicating with the bore of the said outlet piece.

5. Apparatus for pumping viscous fluid consisting of a ported body member formed with an internal cylindrical chamber of tapering bore and communicating through a port in the body member with a source of viscous fluid supply, a bored outlet piece attached to said member and a rotor revolubly mounted in the chamber, said rotor comprising a shaft and a fluid impelling member carried by the shaft, said impelling member having a peripherally disposed surface arranged closely adjacent to and at a slight angle to the inner surface of the cylindrical chamber against the direction of motion, and a delivery duct, extending from a point on the peripheral surface toward and communicating with the bore of the said outlet piece, and means for regulating the position of the rotor longitudinally within the said chamber, as and for the purpose described.

6. Apparatus for pumping viscous fluid consisting of a ported body member formed with a cylindrical chamber communicating through a port in the body member with a source of supply of viscous fluid, a bored outlet piece attached to said body member and a rotor revolubly mounted in the chamber, said rotor comprising a shaft and a plurality of impelling devices arranged side by side along the shaft, each impelling device comprising an impelling part and an annular diaphragm part, said diaphragms adapted to divide the chamber into a series of intercommunicating subdivisional compartments, the first subdivisional compartment of the series of compartments communicating with the said port and the last subdivisional chamber of the series with the said outlet piece, the impelling parts having each a peripherally disposed surface arranged closely adjacent to and at a slight angle to the inner surface of the cylindrical casing against the direction of motion, and means for leading the fluid from the point of maximum pressure in one subdivisional compartment into an adjacent subdivisional compartment, whereby the maximum pressure in one subdivisional compartment becomes the minimum pressure in the next succeeding compartment of the series, the point of maximum pressure on each peripheral surface being situated in the direction of rotation behind the center of the area of the surface.

7. Apparatus for pumping viscous fluid as stated in claim 6, comprising sets of impelling devices arranged to work in opposition to one another, as and for the purpose described.

In testimony whereof I have signed my name to this specification.

HENRY THORNTON NEWBIGIN.